United States Patent
Householder et al.

(10) Patent No.: US 8,016,451 B2
(45) Date of Patent: Sep. 13, 2011

(54) VARIABLE SPOT SIZE LENSES AND LIGHTING SYSTEMS

(75) Inventors: John R. Householder, Reading, MA (US); Lawrence Howard Boxler, Oskaloosa, IA (US)

(73) Assignee: Fraen Corporation, Reading, MA (US)

( * ) Notice: Subject to any disclaimer, the term of this patent is extended or adjusted under 35 U.S.C. 154(b) by 339 days.

(21) Appl. No.: 12/258,607

(22) Filed: Oct. 27, 2008

(65) Prior Publication Data
US 2009/0109687 A1 Apr. 30, 2009

Related U.S. Application Data

(60) Provisional application No. 60/983,051, filed on Oct. 26, 2007.

(51) Int. Cl.
*F21L 4/00* (2006.01)
*F21V 19/02* (2006.01)

(52) U.S. Cl. ........ 362/188; 362/277; 362/285; 362/319; 362/311.02

(58) Field of Classification Search ............ 362/555, 362/558, 308, 309, 296.08, 311.02, 327, 362/187, 188, 277, 285, 319
See application file for complete search history.

(56) References Cited

U.S. PATENT DOCUMENTS

| | | | |
|---|---|---|---|
| 929,795 A | 8/1909 | Siedentopf | |
| 2,254,962 A | 9/1941 | Harris | |
| 6,639,733 B2 | 10/2003 | Minano et al. | |
| 6,827,467 B2 * | 12/2004 | Tenmyo | 362/268 |
| 6,896,381 B2 | 5/2005 | Benitez et al. | |
| 6,899,443 B2 | 5/2005 | Rizkin et al. | |
| 7,083,299 B2 * | 8/2006 | Chapman | 362/188 |
| 7,152,985 B2 | 12/2006 | Benitez et al. | |
| 7,175,299 B2 * | 2/2007 | Uke et al. | 362/187 |
| 7,181,378 B2 | 2/2007 | Benitez et al. | |
| 7,641,365 B2 * | 1/2010 | Katzir et al. | 362/327 |

(Continued)

FOREIGN PATENT DOCUMENTS

DE 20 205 007500 U1 7/2005

(Continued)

OTHER PUBLICATIONS

Edge-ray Design of Compact Etendue-Limited Folded-Optic Collimators, Bill Parkyn, Juan Carlos Miñano, Pablo Benitez, Light Prescriptions Innovators, Irvine CA, SPIE 5185-02 Aug. 3, 2002 (downloaded from http://www.lpi-IIc.com/pdf/airgaprxi.pdf).

(Continued)

*Primary Examiner* — Jong-Suk (James) Lee
*Assistant Examiner* — Peggy A. Neils
(74) *Attorney, Agent, or Firm* — Nutter McClennen & Fish LLP; Reza Mollaaghababa

(57) ABSTRACT

Improved lighting devices and methods are provided. In many embodiments, the devices and methods provide the capability to change a spot of light projected onto a target surface. In other embodiments, the devices and methods are fixed-focus. In one embodiment a lens can have a lens body with anterior and posterior surfaces. The anterior surface can be adapted to receive light from a light source. The posterior surface can have a central portion and a peripheral portion. Some of the light from the light source can pass through the lens body and exit the central portion of the posterior surface via refraction. Some of the light from the light source can pass through the lens body and exit the peripheral portion of the posterior surface via both refraction and reflection at various surfaces of the lens.

41 Claims, 18 Drawing Sheets

U.S. PATENT DOCUMENTS

| | | | |
|---|---|---|---|
| 2002/0085390 A1 | 7/2002 | Kiyomoto et al. | |
| 2003/0016539 A1 | 1/2003 | Minano et al. | |
| 2007/0159847 A1 | 7/2007 | Li | |

FOREIGN PATENT DOCUMENTS

| | | |
|---|---|---|
| DE | 20 2007 006285 U1 | 8/2007 |
| EP | 1617247 A2 | 1/2006 |
| GB | 2037416 | 7/1980 |

OTHER PUBLICATIONS

Nonimaging Optics: Maximum Efficiency Light Transfer VII. Edited by Winston, Roland. Proceedings of the SPIE, vol. 5185, pp. 6-17 (2004).

International Search Report mailed Feb. 6, 2009 for International Application PCT/US2008/081273 (7 pages).

International Search Report, PCT/US2008/081273, mailed Apr. 8, 2009.

\* cited by examiner

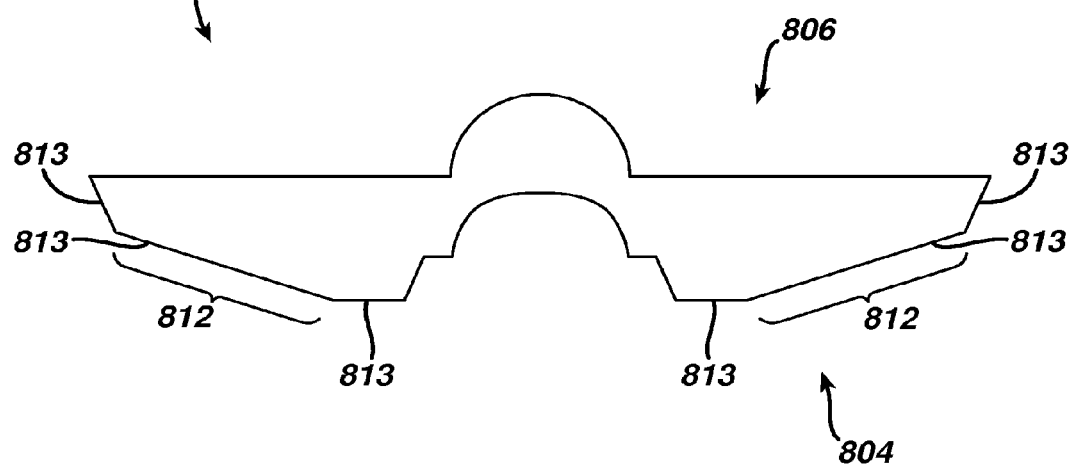
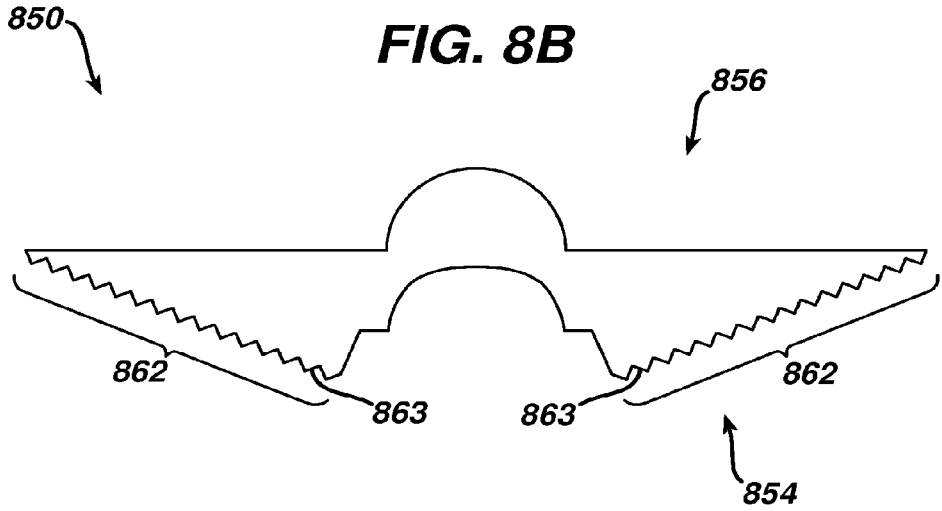

Narrow beam position
- 25.1 cd/lm
- 5.5 degrees FWHM
- 12 degrees FW 10% of maximum Wide beam position
- 7.5 cd/lm
- 12.6 degrees FWHM
- 26 degrees FW 10% of maximum Beam Profile

VARIABLE SPOT SIZE LENSES AND LIGHTING SYSTEMS

This application claims the benefit and priority of U.S. Provisional Application No. 60/983,051, titled "Variable Spot Size Lens and Lighting System" and filed Oct. 26, 2007.

FIELD

This disclosure relates generally to lenses, illumination devices, and illumination methods, and relates more particularly to such lenses, devices, and methods that employ a combination of reflection and refraction to generate a desired, typically adjustable, light pattern on a target surface.

BACKGROUND

Optics for high-power light sources, such as light emitting diodes, can produce illumination with a variety of characteristics. Different applications may require different levels of performance in terms of coherence, intensity, uniformity of the light projected, as well as the illumination pattern produced.

At the same time, many lighting applications call for the ability to change the size of a projected light spot. For example, flashlights, spotlights, and adjustable or customizable lighting systems, among others, can all make use of such variable-focus capabilities. However, creating such an adjustable light is challenging. To date, lighting systems with variable-focus features have typically utilized a reflector that simply can be moved with respect to a light source to change the size of a light spot projected onto a target surface. The capabilities of these lighting systems—and consequently the products in which they are used—are limited and their illumination characteristics sub-optimal.

Accordingly, there is a need for improved lenses and lighting systems, and particularly those that can produce an adjustable light pattern.

SUMMARY

Lenses, illumination devices, and illumination methods are disclosed. In one exemplary embodiment, a lens includes a lens body disposed about an optical axis and characterized by an anterior surface and a posterior surface. At least a portion of the anterior surface can be adapted for receiving light from a light source, such as a light emitting diode, incandescent bulb, or other kind of light source. The posterior surface can have a central portion and a peripheral portion. For at least one position of the light source along the optical axis, the peripheral portion of the posterior surface primarily reflects light that is incident thereon via a single passage through the lens body from the light source, and the central portion of the posterior surface primarily refracts light that is incident thereon via a single passage through the lens body from the light source. In many cases, the reflection from the peripheral portion of the posterior surface can be achieved by total internal reflection.

The term "primarily" is used in conjunction with refraction, reflection, or other behaviors of light to indicate that a significant majority of light is controlled in the designated manner. For example, in the above embodiment, the peripheral portion of the posterior surface can primarily refract light by refracting at least about 60%, in some cases at least about 75%, in some cases at least about 90%, and in other cases at least about 95% of light energy that is incident thereon (e.g., via a single passage through the lens body from the light source). The peripheral portion of the anterior surface can primarily reflect light by reflecting at least about 60%, in some cases at least about 75%, and in some cases at least about 90%, and in other cases at least about 95% of light energy that is incident thereon (e.g., via a single passage through the lens body from the light source).

Further, in some embodiments, the anterior surface can include a peripheral portion adapted to receive light reflected by the peripheral portion of the posterior surface. The anterior peripheral portion can reflect light received from the peripheral portion of the posterior surface back thereto, and in some cases this reflection can be achieved by coating the peripheral portion of the anterior surface with a reflective material. Further, the peripheral portion of the anterior surface can reflect light received from the peripheral portion of the posterior surface back thereto at an angle such that the peripheral portion of the posterior surface primarily refracts the light as it exits the lens body.

In another aspect, a lens is provided which includes an optic having an anterior surface and a posterior surface disposed about an optical axis. Each of those surfaces can have a central portion and a peripheral portion, the central portion of the anterior surface being adapted to receive light from a source disposed along the optical axis and the central portion of the posterior surface being adapted to refract at least some of the source light entering the optic. Further, for any of a plurality of positions of the source along the optical axis, the peripheral surface portions can be adapted to direct at least some of the received source light out of the optic via successive reflections at the peripheral portions of the anterior surface and posterior surfaces, followed by refraction at the peripheral portion of the posterior surface. The successive reflections can include total internal reflection and/or reflection from a reflective surface, such as a reflective coating on the peripheral portion of the posterior surface and/or the peripheral portion of the anterior surface. In some cases, the plurality of positions of the source can include all positions in which light exiting the source at an angle of about 25 degrees or more to the optical axis is incident on the central portion of the anterior surface.

In another aspect, a lens is provided which includes a lens body having an anterior surface and a posterior surface, the anterior and posterior surfaces being configured such that a central portion of the anterior surface is adapted to receive light from a light source. For at least one position of the light source anterior to the central portion of the anterior surface, a central portion of the posterior surface can be configured to primarily cause refraction of light from the light source incident thereon via passage through the lens body and a peripheral portion of said posterior surface can be configured to primarily cause reflection (which in many cases can be total internal reflection, or can be otherwise) of light from the light source incident thereon via a single passage through the lens body.

Further, in some embodiments, a peripheral portion of the anterior surface can be configured to primarily cause reflection (for example, total internal reflection or reflection from a reflective coating) of light that is incident on the peripheral portion of the anterior surface as a result of being reflected from the peripheral portion of the posterior surface. Yet further, in some embodiments, the peripheral portion of the anterior surface can be configured to reflect the light in such a way that it travels to the peripheral portion of the posterior surface and is refracted there as it leaves the lens.

In yet another aspect, a lens is provided which includes a lens body disposed about an optical axis and characterized by an input surface and an output surface. At least a portion of the input surface can be adapted for receiving light from a light source, and the output surface can have a central portion and a peripheral portion. In many cases, for at least one position of the light source along the optical axis, light from the light source exiting the output surface consists essentially of (i) light exiting via refraction at said output surface following a single passage through the lens body, and (ii) light exiting via refraction at the output surface following successive reflections. In other embodiments, for at least one position of the light source along the optical axis, light from the light source exiting the output surface consists essentially of (i) light exiting via refraction at the output surface following a single passage through the lens body, and (ii) light exiting via refraction at the output surface following at least three passages from one surface of the lens body to another.

The lens can be configured to produce a variety of kinds of illumination. For example, in some cases, the light exiting the output surface via the central portion can primarily converge. In other embodiments, the light exiting the output surface via the peripheral portion can primarily diverge. In some cases, for the at least one position of the light source, the light exiting the output surface can be characterized by a divergence angle of greater than about 10 degrees from the optical axis. For at least one other position of the light source, the light exiting the output surface can be characterized by a divergence angle of less than about 5 degrees from the optical axis.

In yet another aspect, a lens is provided which comprises a lens body disposed about an optical axis and characterized by an anterior surface and a posterior surface, at least a portion of the anterior surface being adapted for receiving light from a light source. The posterior surface and the anterior surface can each have a central portion and a peripheral portion. The peripheral portion of said posterior surface can have a flat profile, the central portion of the posterior surface can have a convex profile, and the peripheral portion of the anterior surface can have any of a substantially cup-shaped, parabolic, and elliptical profile. Further, the central portion of the anterior surface can have a concave profile adapted to receive a light source. In some cases, at least a portion of the peripheral portion of the anterior surface can include a reflective coating.

Optical systems are also disclosed herein. In one exemplary embodiment, an optical system includes a light source and a lens optically coupled to the light source for receiving light therefrom. The lens can have a central portion and a peripheral portion. The lens can be adapted such that, for at least one location of the light source relative to the lens, the central portion refracts light from the light source passing therethrough to couple the light out of the lens, and the peripheral portion both causes reflection of light from the light source propagating through the lens in a single passage to reach the peripheral portion and causes refraction of light from the light source propagating through the lens in more than two passages to couple the light out of said lens.

In some embodiments, the peripheral portion can reflect light from the light source propagating through the lens in a single passage to reach the peripheral portion at a first surface and can reflect light at a second surface before refracting light that is exiting the lens.

Further, the peripheral portion can include an anterior surface and a posterior surface, with the anterior surface of the peripheral portion being adapted to receive light reflected by said posterior surface of the peripheral portion. For example, the anterior surface can receive, via the lens body, light totally internally reflected at the posterior surface. In another embodiment, the peripheral portion can reflect, at a first surface, light from the light source propagating through the lens in a single passage to reach said peripheral portion and can reflect, at a second surface, light reflected from the first surface, and can refract, at the first surface, light reflected from the second surface to couple the light out of the lens.

In another aspect, an exemplary optical system includes a light source and a lens optically coupled to the light source to receive light therefrom. The lens can have a central portion and a peripheral portion. The lens can be adapted such that, for at least one position of the light source relative to the lens, light entering the central portion via an input surface thereof leaves the lens via refraction at an output surface of the central portion and light entering the peripheral portion via an input surface thereof undergoes at least one reflection (in some cases, total internal reflection) at an output surface of the peripheral portion before leaving the lens via refraction at said output surface of the peripheral portion.

Further, in some embodiments, the lens can be configured such that the light entering the central portion via an input surface thereof leaves the lens after a single passage through the central portion via refraction at an output surface of the central portion.

In another aspect, a flashlight is disclosed which includes a headpiece having proximal and distal ends, a lens disposed in the headpiece at a distal end thereof and having an input surface and an output surface, and a light source optically coupled to the lens. The flashlight can further include a translation mechanism coupled to the light source and/or the lens. The translation mechanism can change the position of the light source and the lens relative to one another along an optical axis of the lens, for example between a narrow beam position and a wide beam position. The narrow beam position can be characterized by light from the light source primarily exiting the lens distally via refraction from a central portion of the output surface. The wide beam position can be characterized by light from the light source exiting the lens distally via refraction from a central portion of the output surface and via refraction from a peripheral portion of the output surface following successive reflections from the peripheral portion of the output surface and a peripheral portion of the input surface. In some cases, at least one of the successive reflections can be total internal reflection (for example, from the peripheral portion of the output surface). The translation mechanism can provide a continuous range of adjustment between the wide beam position and the narrow beam position, or can be adapted such that a user can select one of a plurality of discrete positions, each of which may produce a different light pattern.

In some embodiments, the narrow beam and wide beam positions can produce light beams illuminating areas with different divergence angles and different flood spreads on a target surface. For example, the narrow beam position can be characterized by light exiting the output surface with a divergence of less than about 5 degrees to the optical axis, and the wide beam position can be characterized by light exiting said output surface with a divergence of greater than about 10 degrees to the optical axis. As another example, the narrow beam position can be characterized by converging light exiting the output surface from its central portion and diverging light exiting the output surface from its peripheral portion.

The flashlight can have a variety of other features. For example, the housing can be coupled to the proximal end of the headpiece and can enclose a portable power source, such as a battery. The central portions of the input and output surfaces can define a portion of the optic providing an optical power, which can be converging or diverging. The lens can have a variety of shapes and sizes. For example, the peripheral portion of the output surface can have a flat profile, and the peripheral portion of the input surface can have any of a substantially cup-shaped, parabolic, and elliptical profile. A variety of other shapes can be used.

Methods of illumination are also disclosed. One exemplary method includes providing a lens body having an optical axis, emitting light from a light source disposed at a position along the optical axis, and receiving light from the light source at an anterior surface of the lens body. The method can further include primarily refracting that portion of the received light that propagates from the anterior surface through the lens body at an angle of less than about 20 degrees (or in other embodiments, less than about 15 degrees) to the optical axis; and primarily reflecting (in many cases, totally internally reflecting) that portion of the received light that propagates from the anterior surface through the lens body at an angle of greater than about 40 degrees (or in other embodiments, greater than about 50 degrees) to the optical axis.

In some embodiments, the method can further include moving the light source to a second position along the optical axis and, with the light source at the second position, receiving light from the light source at an anterior surface of the lens body, primarily refracting that portion of the received light that propagates from the anterior surface through the lens body at an angle of less than about 25 degrees to the optical axis; and primarily reflecting that portion of the received light that propagates from the anterior surface through the lens body at an angle of greater than about 45 degrees to the optical axis. In some cases, this refraction and this reflection both occur at a posterior surface of the lens body.

In yet other embodiments, the method can further include receiving the primarily reflected light at the anterior surface and reflecting that light (in other words, the received and primarily reflected light) from the anterior surface at a divergence of less than about 5 degrees to the optical axis.

A wide range of other features can be employed in connection with any of the foregoing lenses, devices, and methods. For example, the anterior surface and posterior surface of a lens each can have a central portion adapted to receive light from the light source, with central portions of the anterior surface and the central portion of the posterior surface together defining a portion of the lens body that provides an optical power. The optical power can be diverging or converging, and in some cases can be in a range of about 120 to about 160 diopters, and in other cases in a range of about 130 to about 150 diopters.

Further, any of the foregoing lenses can have a variety of shapes and sizes. For example, the peripheral portion of the posterior surface can have a flat profile, and the central portion of the posterior surface can have a convex profile. The peripheral portion of the anterior surface can have any of a substantially cup-shaped, parabolic, and elliptical profile. As one skilled in the art will understand, a variety of other shapes can be used. In many cases, a portion of the anterior surface can have a concave profile, which forms a cavity into which the light source can be inserted.

Virtually any light source can be employed. For example, in many cases light emitting diodes are used. In other embodiments, the light source can be provided by incandescent sources, arc lamps and gas discharge lamps, high intensity discharge lamps, and so on.

BRIEF DESCRIPTION OF THE DRAWINGS

The invention will be more fully understood from the following detailed description should be taken in conjunction with the accompanying drawings, in which:

FIG. 8A is a schematic view of an exemplary embodiment of a lens having a posterior surface and a faceted anterior surface, the schematic view depicting an exemplary cross-section of the lens;

FIG. 8B is a schematic view of another exemplary embodiment of a lens having a posterior surface and a faceted anterior surface, the schematic view depicting an exemplary cross-section of the lens;

DETAILED DESCRIPTION

Figure 1A:
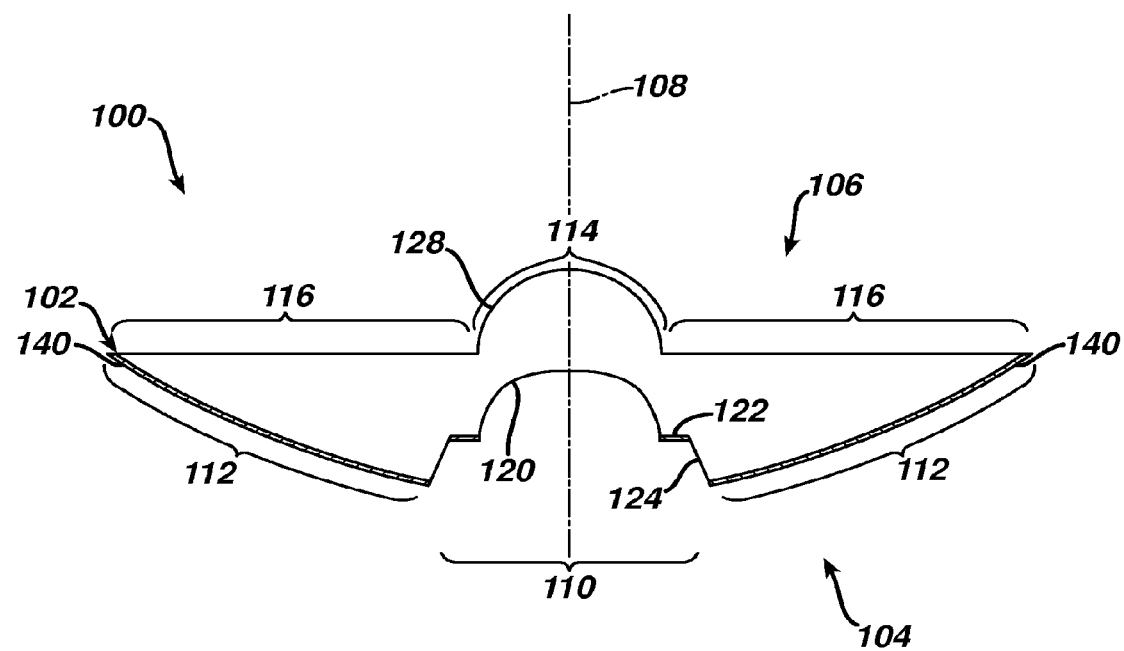
FIG. 1A is a schematic view of a lens according to one exemplary embodiment of the invention, the lens having posterior and anterior surfaces, the schematic view depicting an exemplary cross-section of the lens.

Certain exemplary embodiments will now be described to provide an overall understanding of the principles of the structure, function, manufacture, and use of the devices and methods disclosed herein. One or more examples of these embodiments are illustrated in the accompanying drawings. The devices and methods specifically described herein and illustrated in the accompanying drawings are non-limiting exemplary embodiments, as the scope of the present application is defined solely by the claims. Throughout this application, the term "e.g." will be used as an abbreviation of the non-limiting phrase "for example."

A variety of embodiments will be presented herein. It should be understood that the features illustrated or described in connection with one exemplary embodiment may be combined with the features of other embodiments. Such modifications and variations are intended to be included within the scope of the present disclosure.

Generally, the present disclosure relates to lenses, illumination devices and illumination methods that employ a combination of reflection and refraction to generate a desired, and typically adjustable, light pattern on a target surface. The terms reflection and refraction are known in the art and are used herein accordingly, as will be shown by the exemplary embodiments described below and illustrated in the FIGURES.

The lenses, devices and methods disclosed herein can be used in a wide variety of applications. Such applications include, without limitation, flashlights and wearable headlamps, long distance lighting applications such as spotlighting or other lighting used in theatres, warehouses, and in other settings. Further, they can be useful in applications requiring illumination in conditions of degraded visibility, such as underwater lighting, emergency services lighting (e.g., firefighter headlamps), or military applications.

As will be described in more detail below, some embodiments can advantageously produce a relatively narrow beam to illuminate an object (in some cases, illuminating an object at a long distance, in conditions of degraded visibility, or otherwise) while providing a surrounding illumination that is relatively uniform (for example, to provide context or peripheral vision, such as when spotlighting an actor on a stage, or when illuminating a narrow footpath and the vegetation at its edges). Further, some embodiments can provide a variable-focus capability. The term variable-focus is used herein to mean changing or adjusting the light produced by the lens. In many cases, this is accomplished by changing the focal plane of the light produced. For example, some embodiments can advantageously provide the ability to adjust the lighting pattern from a relatively narrow to a relatively wide beam pattern (and vice versa), with the wide beam providing a different illumination pattern (for example, a wide beam of relatively uniform illumination) than the narrow beam.

By way of further introduction, in some embodiments, an illumination module is provided that includes a light source (e.g., a light emitting diode) that is optically coupled to a lens having a central segment and a peripheral segment. A change in the relative position of the light source and the lens can adjust an illumination pattern generated by the lens. Further, for at least one position of the light source relative to the lens, a portion of the light entering the lens leaves the lens via refraction at the lens surfaces while another portion of the light entering the lens leaves the lens via both refraction and reflection at various surfaces of the lens.

Figure 1B:
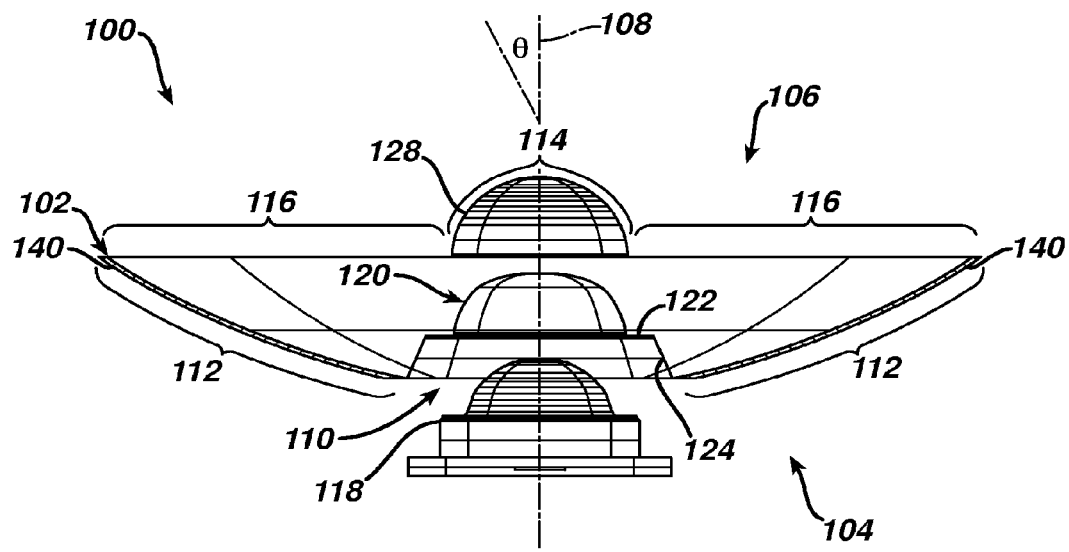
FIG. 1B is a schematic view of the lens shown in FIG. 1A with an exemplary light source positioned along its optical axis.
Figure 1C:
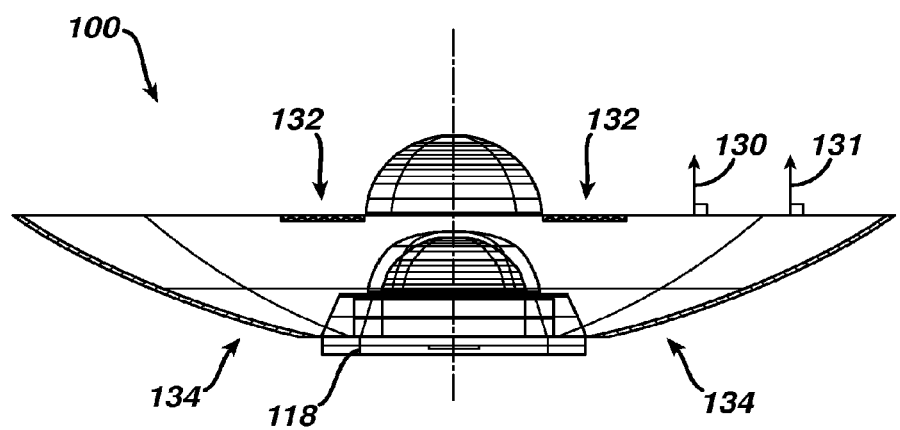
FIG. 1C is a schematic view of the lens and light source shown in FIG. 1B with the light source in a different position on the optical axis.

FIGS. 1A-1C illustrate an exemplary cross section of a lens 100 according to one exemplary embodiment of the invention. Lens 100 includes an optic 102 (herein also referred to as a lens body) having an anterior surface 104 (herein also referred to as an input surface) and a posterior surface 106 (herein also referred to as an output surface), which are disposed about an optical axis 108. The anterior surface 104 includes a central portion 110 that is surrounded by a peripheral portion 112. Similarly, the posterior surface 106 includes a central portion 114 that is surrounded by a peripheral portion 116.

As shown in FIGS. 1B and 1C, the lens 100 can be optically coupled to a light source 118. For example, the lens 100 can receive light from a source that is disposed, fixedly or movably, along the optical axis 108 and can project the received light distally, e.g., to the external environment and/or to target surfaces. FIGS. 1B and 1C show two exemplary positions of the light source 118, which will be described in more detail below, however any position is possible. In many embodiments, the relative positions of the light source 118 and optic 102 can be adjusted over a continuous range, or in any number of discrete steps, to provide a variable-focus capability.

The light projected by the lens 100 can be characterized by an angular distribution of light rays about the optical axis 108, which in many cases is different from the angular distribution of the light emitted by the source 118. In this embodiment, the central portions of the anterior and posterior surfaces 110, 114 together define a central segment of the optic 102 (the segment being contained between those two surfaces 110, 114) which couples light therethrough primarily via refraction for at least one position of the light source 118 relative to the optic 102. The central portions 110, 114 can thus form a refractive lens. In addition, the peripheral portions of the anterior and posterior surfaces 112, 116 together define a peripheral segment of the lens that couples light therethrough primarily via both reflection and refraction. The combination of the light passing through the central segment and the peripheral segment of the optic 102 can provide improved illumination characteristics, and can be controlled by the position of the light source 118 relative to the optic 102.

More specifically, and with continuing reference to FIGS. 1B and 1C, in one embodiment the central portion of the anterior surface 110 is adapted to receive light from a light source 118. To this end, in this implementation the central portion of the anterior surface 110 includes a concave surface 120 (e.g., a spherical or conical surface, or other surface accommodating the shape of the light source) that extends via a lip 122 to an approximately conical surface portion 124 (e.g., a frustum) that flares out from the lip 122 to form an entrance aperture for receiving light rays from the light source 118. The shape and size of the entrance aperture, including the configuration of the concave surface 120 and/or lip 122, if any, can vary depending on the light source. Although the lens 100 can be optically coupled to any coherent or non-coherent light source, in this example, the light source 118 comprises a light emitting diode (LED), which is disposed along the optical axis 108. Other examples of light sources include, without limitation, incandescent lamps (including halogen lamps), electric discharge lamps, arc lamps, and gas-discharge lamps.

In this embodiment, the central portion of the posterior surface 114 has a convex or outwardly curved surface 128. The convex surface 128 on the posterior surface 104 and the concave surface 120 on the anterior surface 106 can have radii of curvature that are selected such that the central segment of the lens 100 provides a converging optical power. For example, the radius of curvature of the convex surface 128 can be in a range of about −2 millimeters (mm) to about 4 mm, and more preferably in a range of about −2.5 mm to about 3.5 mm. The radius of curvature of the concave surface 120 can be in a range of about −0.5 mm to −14 mm, and more preferably in a range of about −1 mm to about 13 mm. In some cases, the converging optical power of the central segment can be in a range of about 120 to about 160 Diopters, and more preferably in a range of about 130 to about 150 Diopters. It should be understood that while shown as having substantially spherical profiles, the shape of the central portions 110, 114 can vary widely. For example, the surfaces can be generally cup-shaped, or can be parabolic, elliptical, or defined by other conic sections.

In this embodiment, the peripheral portion of the posterior surface 116 shown in FIGS. 1A-1C is flat. As one skilled in the art will understand, a flat surface can be perfectly flat but can also have small variations due to manufacturing tolerances. These variations can be such that normal vectors at any two locations on the peripheral portion of the posterior surface 116, such as exemplary normal vectors 130 and 131 of FIG. 1C, may have a slight angle between them (e.g., 10 degrees or less, 5 degrees or less, or 1 degree or less, depending for example on manufacturing tolerances).

In the exemplary embodiment of FIGS. 1A-1C, the peripheral portion of the anterior surface 112 is substantially cup-shaped and, more specifically, it is parabolic. In other words, the peripheral portion 112 forms a portion of a paraboloid of revolution having the optical axis 108 as its axis of rotational symmetry. In some cases, the central portion of the posterior surface 114 and/or the central portion of the anterior surface 110 can have a certain degree of asphericity, e.g., one characterized by a conic constant in a range of about −0.5 to about −1.5.

It should be noted that for the exemplary embodiments disclosed herein the FIGURES depict exemplary two-dimensional cross sections lenses and are described in terms of two-dimensional representations. Those two-dimensional representations can be extended, e.g., rotationally, into three dimensions to create a device (as shown, for example, with FIGS. 13A-13D). Typically a symmetric three-dimensional extension, e.g., a rotationally symmetric extension about the optical axis 108, can be employed, however the teachings herein can be applied to non-symmetric surfaces as well, e.g., in the case of a oval, parabola, and so on. In addition, the surfaces described herein can be linearly extended into three dimensions, for example to create a rectangular lens.

Figure 2:
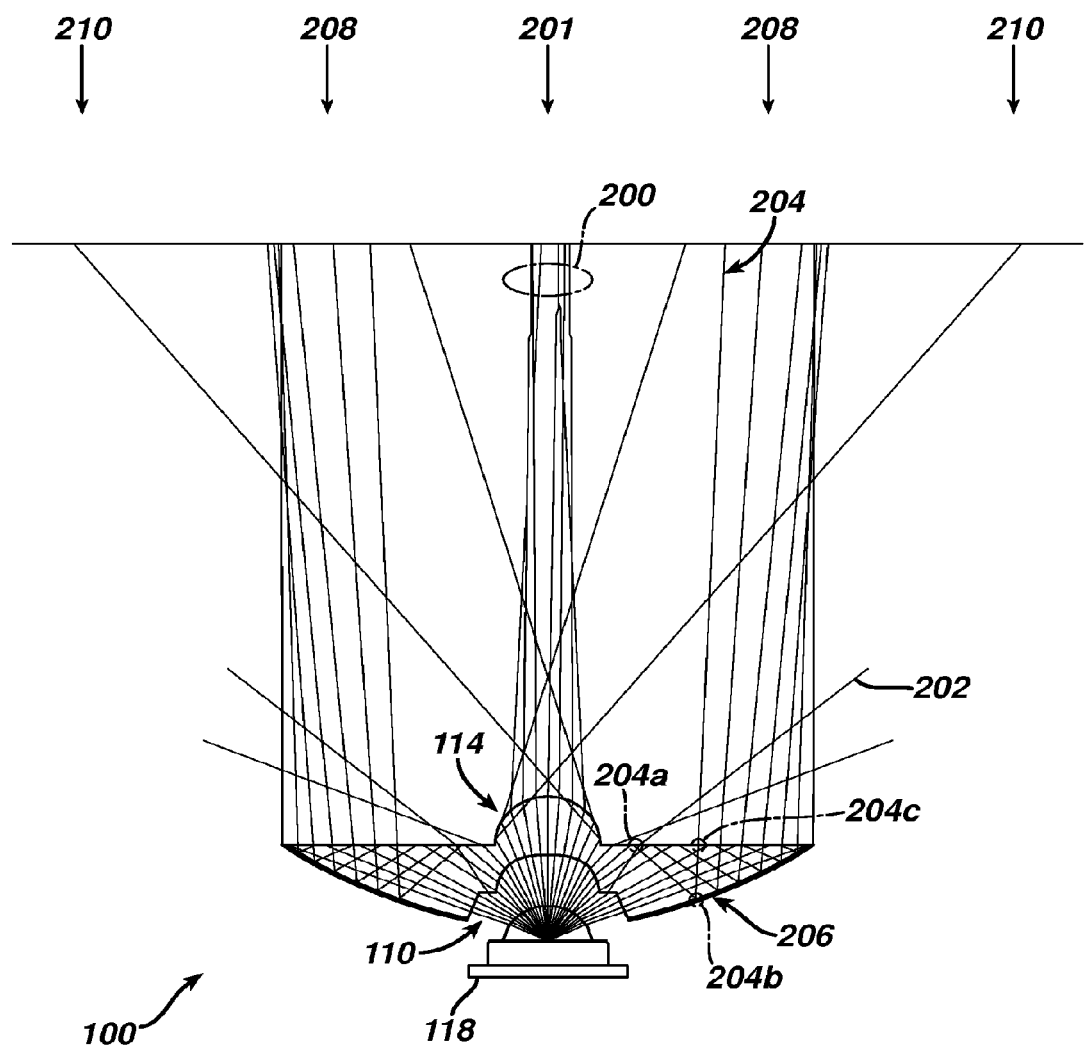
FIG. 2 is a schematic view of the lens and light source shown in the positions of FIG. 1B with exemplary ray traces to represent light from the light source passing through the lens.

FIG. 2 illustrates the lens 100 shown in FIG. 1A-1C with exemplary light ray traces. For the position of the light source 118 relative to the lens 100 that is shown in FIG. 2, which for descriptive purposes is hereinafter referred to as a "narrow beam position," some of the light rays entering the optic 102 via the central portion of the anterior surface 110 pass through the optic 102 and are incident on the central portion of the posterior surface 114. The majority of these rays undergo refraction at the central portion of the posterior surface 114 to exit the optic as output rays 200. These output rays 200 form a converging set of light rays which can generate a light spot on a target surface, for example, on a projection screen. As shown, the light spot 201 can form a narrow spot projection whose size can be determined by the optical power of the central portions 110, 114. In other words, the central portion of the posterior (output) surface 114 primarily refracts the light rays entering the optic 102, via the anterior surface 104, that are incident thereon. For example, it can refract at least about 75%, and in some cases at least about 90%, and in other cases at least about 95% of light energy incident thereon. Other light may be scattered, reflected, or otherwise passed through the surface 114.

With continued reference to FIG. 2, in this narrow beam position of the light source 118, some of the light entering the optic 102 via the central portion of the anterior surface 110 passes through the lens body 102 to be incident on the peripheral portion of the posterior surface 116. While some of those incident light rays (e.g., ray 202) exit the optic 102 via refraction at the posterior surface 106, a large portion of these light rays (e.g., ray 204 at location 204a) undergo total internal reflection at the peripheral portion of the posterior surface 116 to be directed towards the peripheral portion of anterior surface 112. As is known in the art, total internal reflection can occur at an interface between two media having different indices of refraction when the light traversing the medium having the larger index is incident on the interface at an angle relative to a normal to the interface that exceeds a critical angle, which can be defined by the following relation:

$$\theta_{crit} = \arcsin\frac{n_2}{n_1}$$

where $n_1$ is the refractive index of the medium having the larger index and $n_2$ is the refractive index of the medium having the lower refractive index.

With continued reference to FIG. 2, the light rays that are totally internally reflected at the peripheral portion of the posterior surface 116 pass again through the optic 102 to be incident on the peripheral portion of the anterior surface 112. In this implementation, a reflective coating 206 (for example, a thin metal coating, such as a thin silver or gold coating, for example with a thickness of about 500 Angstroms to about 3000 Angstroms) covers the peripheral portion of the anterior surface 112. The reflective coating 206 can cause specular reflection of the light rays incident thereon. In other embodiments, as discussed below, the reflection at the peripheral portion of the anterior surface 112 can be achieved via total internal reflection. More specifically, in this case, the reflective coating 206 causes reflection of the light rays (e.g., ray 204 at location 204b) incident thereon at the peripheral portion of the anterior surface 112 back to the peripheral portion of the posterior surface 116. These returning rays are then refracted at the peripheral portion of the posterior surface 116 to exit the optic 102 (e.g., ray 204 at location 204c). These rays (e.g., ray 204) that leave the optic via successive reflections at the peripheral portions of the posterior and anterior surfaces 112, 116 followed by refraction at the peripheral portion of the posterior surface 116 can produce a region 208 of illumination surrounding the central light spot 201 produced by light rays 200, for example to provide background lighting. (It should be understood that the illustration of regions 201, 208 and others hereafter, are for explanatory purposes and are not intended to denote a specific light pattern that must be achieved.) In this implementation, these rays (e.g., ray 204) leave the optic 102 with a relatively narrow angular divergence. By way of example, this angular divergence can be characterized by a maximum divergence angle relative to the optical axis 102 (shown as θ (theta) in FIG. 1B) of about 5 degrees or less. However, in other embodiments, the peripheral portion of the posterior surface 116 can be configured or modified to provide other divergence characteristics, as will be described in more detail below.

As shown schematically in FIG. 2, the rays (e.g., light ray 204) exiting the peripheral portion of the anterior surface 116 of optic 102 can illuminate a region surrounding the light spot (e.g., light rays 200) generated by the central segment of the optic 102. Further, as also shown schematically in FIG. 2, some of the light rays reaching the peripheral portion of the posterior surface 116 that are not totally internally reflected but are refracted to leave the optic (e.g., ray 202) can exhibit divergence angles that are larger than those exhibited by rays that undergo successive reflections at the posterior and anterior surfaces 104, 106, respectively (e.g., as was described with respect to ray 204, above). These rays can then leave the optic 102 via refraction at the peripheral portion of the posterior surface 116. As such, in this position of the light source 118 relative to the lens 100, the rays (e.g., ray 202) leaving the peripheral portion of the posterior surface 116 only via refraction can illuminate regions 210 beyond those illuminated by the central light spot 201 and the illumination region 208 surrounding that spot 201. The orientation of the posterior surface 106 (e.g., its angle relative to the optical axis 108), can be adjusted to obtain the desired composition of light rays (e.g., ray 204) undergoing total internal reflection at the peripheral portion of the posterior surface 116 before leaving the posterior surface 106 and of rays (e.g., ray 202) leaving the peripheral portion of the posterior surface 116 via refraction only.

Figure 3:
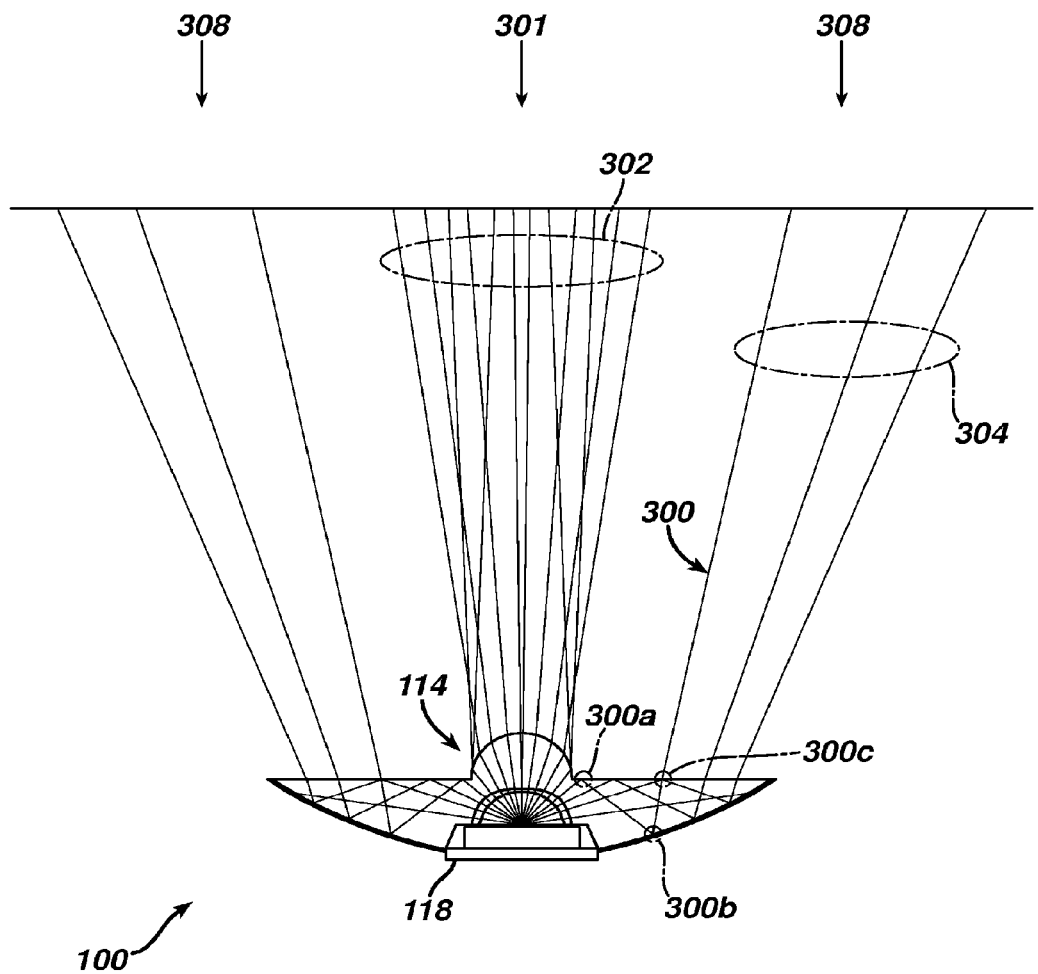
FIG. 3 is a schematic view of the lens and light source shown in the positions of FIG. 1C with exemplary ray traces to represent light from the light source passing through the lens.

FIG. 3 schematically shows another position of the light source 118 relative to the optic 102, which for descriptive purposes is hereinafter referred to as a "wide beam position" and in which the light source is closer to the optic 102 than in the narrow beam position. (It should be understood that the terms "wide beam position" and "narrow beam position" herein are used to distinguish amongst relative positions of the light source 118 and the illumination resulting therefrom, and do not necessarily indicate a specific position, beam pattern, separation distance, or path of light rays.) As with the narrow beam position shown in FIG. 2, the light from the source 118 is coupled into the optic 102 via the central portion of the anterior surface 110. For this position of the light source 118, the central portion of the posterior surface 114 primarily refracts light rays incident thereon. The peripheral portion of the posterior surface 116 primarily reflects the input light rays that reach it directly from the anterior surface 104 (that is, the light rays that enter the optic 102 reflectively via the anterior surface 104 and traverse the optic without undergoing any intervening reflection and/or refraction at any other surface of the optic 102 before reaching the peripheral portion of the posterior surface 116). More specifically, light rays (e.g., ray 300) that reach the peripheral portion of the posterior surface 116 via a single passage through the optic (e.g., ray 300 at location 300*a*) undergo total internal reflection and are directed to the peripheral portion of the anterior surface 112. The rays are then reflected at the peripheral portion of the anterior surface 112 (e.g., ray 300 at location 300*b*) to be directed again towards the peripheral portion of the posterior surface 116. Again, in this implementation the peripheral portion of the anterior surface 112 has a reflective coating 206, although in some embodiments this coating can be omitted. The returning light rays that are incident on the peripheral portion of the posterior surface 116 at angles that are less than the critical angle for internal reflection are refracted at the posterior surface (e.g., ray 300 at location 300*c*) and exit the optic 102.

With continued reference to FIG. 3, in this exemplary wide beam position the light rays leaving the optic 102 via the central portion of the posterior surface 114 (e.g., central rays 302) form a set of diverging rays with a maximum divergence angle that is larger than the maximum divergence angle for rays leaving the central portion 114 in the narrow beam position. These rays can form a central light spot 301 on a projection surface with a diameter larger than the central light spot 201 produced by the lens 100 when the light source 118 is farther away (e.g., in the narrow beam position of the source 118 shown in FIG. 2).

The light rays leaving the optic 102 via the peripheral portion of the posterior surface 116 (e.g., rays 304), in turn, can exhibit a greater divergence than the central rays (e.g., rays 302) and hence can illuminate an area 308 surrounding the central spot on the projection screen. In this manner, the combination of the light rays leaving the optic 102 via the central and peripheral portions of the posterior surface 114, 116 in this exemplary larger beam position of the source 118 can illuminate a wider area than the one illuminated in the narrow beam position. The rays leaving the optic from the central portion (e.g., rays 302) and from the peripheral portion 116 (e.g., rays 304) can combine to provide a wide beam spread (which can be, for example, wider than that produced by the positioning of the light source 118 and lens 100 in FIG. 2).

With reference to FIG. 3, it should be understood that in the wide beam position some light rays may pass through the optic 102 once and exit via refraction at the peripheral portion of the posterior surface 116 (for example, similar to exemplary ray 202 in FIG. 2), which may provide some illumination peripheral to regions 301 and 308.

The size of the lens 100, as well as the relative sizes of the central and peripheral portions of the anterior and posterior surfaces, can vary according to design prerogatives. By way of example, however, in some embodiments light rays exiting the light source 118 and entering the lens at a divergence angle of about 10 degrees or less (and in other embodiments, about 20 degrees or less, 25 degrees or less, or about 30 degrees or less) from the optical axis 108 pass through the central segment of the optic 102 and are primarily refracted by the central portion of the posterior surface 114. In some embodiments, light rays exiting the light source 118 and entering the lens 100 at a divergence angle of about 50 degrees or more (and preferably about 45 degrees or more, and more preferably about 40 degrees or more) relative to the optical axis 108 are primarily reflected internally at the peripheral portion of the posterior surface 116, reflected at the peripheral portion of the anterior surface 112, and refracted at the peripheral portion of the posterior surface 116. Such angles can depend on the treatment of the posterior surface 116. For example, if total internal reflection is utilized at this surface 116, then the portion of rays that are reflected from surface 116 can be defined with reference to the critical angle. In other cases, the surface 116 can be made to be reflective (either completely or partially, for example, via a reflective coating) and such reflectivity can control the portion of the rays that are reflected from surface 116.

Figure 4:
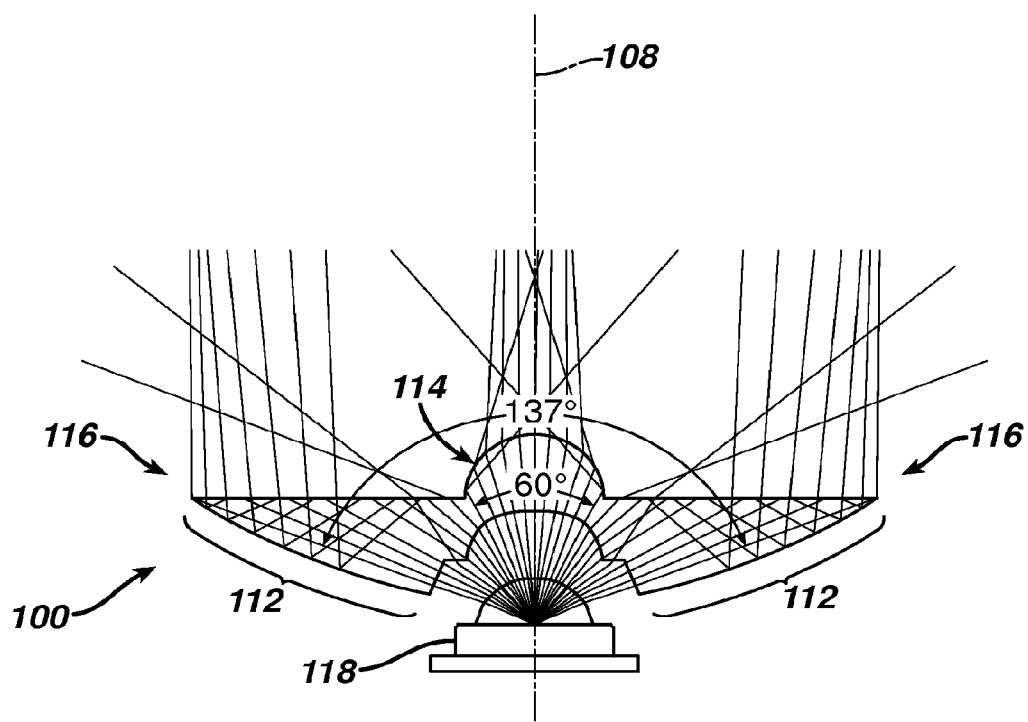
FIG. 4 is a schematic view of the lens and light source shown in the positions of FIG. 1B with exemplary ray traces to represent light from the light source passing through the lens.

By way of further illustration, FIG. 4 shows one exemplary configuration of the lens 100 and light source 118 in which light rays exiting the light source 118 at a divergence angle of about 30 degrees or less from the optical axis 108 (that is, about 60 degrees total beam width) pass through the central segment of the optic 102 and are primarily refracted by the central portion of the posterior surface 114. Light rays exiting the light source 118 at a divergence angle of about 68.5 degrees or less relative to the optical axis 108 (that is, about 137 degrees total beam width) but more than about 30 degrees are primarily internally reflected, at the peripheral portion of the posterior surface 116, and then reflected at the peripheral portion of the anterior surface 112, and are subsequently refracted at the peripheral portion of the posterior surface 116 to leave the optic 102.

Figure 5:
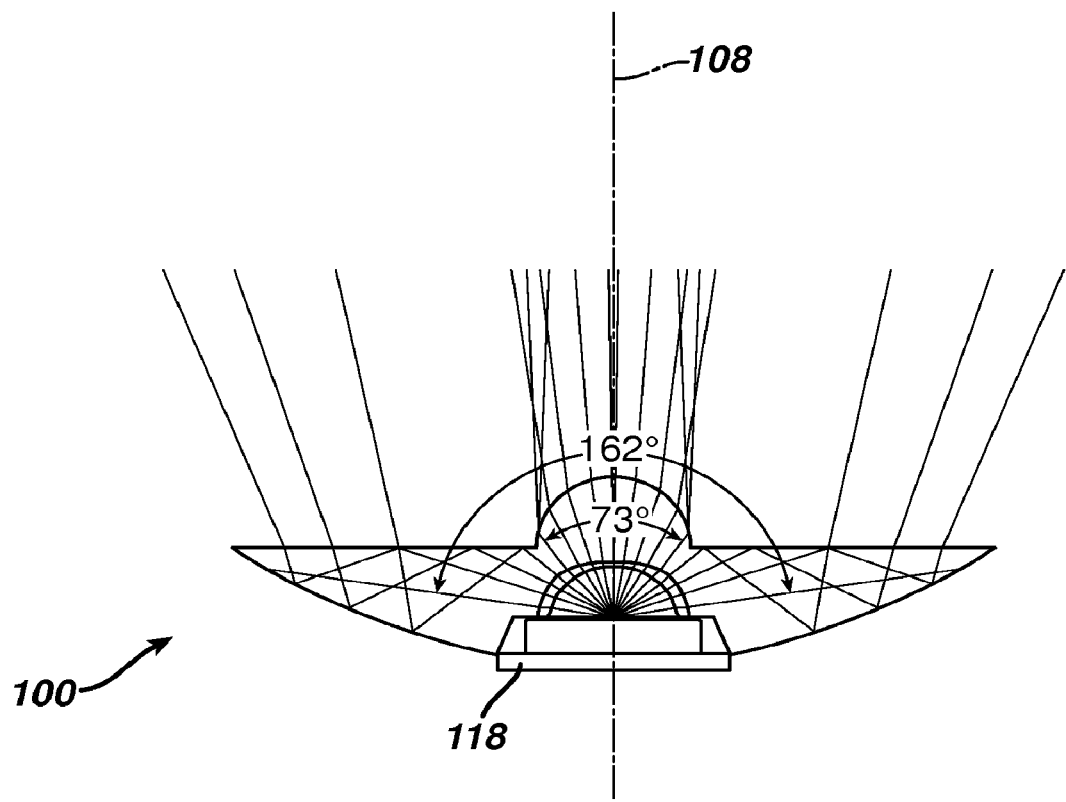
FIG. 5 is a schematic view of the lens and light source shown in the positions of FIG. 1C with exemplary ray traces to represent light from the light source passing through the lens.

FIG. 5 shows the lens 100 in a wide beam position in which light rays that exit the light source 118 at a divergence angle of about 36.5 degrees or less from the optical axis 108 (that is, about 73 degrees total beam width) pass through the central segment of the optic and are primarily refracted by the central portion of the posterior surface 114. Light rays exiting the light source at a divergence angle of about 81 degrees or less from the optical axis 108 (that is, about 162 degrees total beam width) but more than about 36.5 degrees are primarily internally reflected at the peripheral portion of the posterior surface 116, reflected at the peripheral portion of the anterior surface 112, and refracted at the peripheral portion of the posterior surface 116 to leave the optic 102.

The lens 100 can be made from a variety of optical materials. Generally, the lens 100 can be formed of a material that is substantially transparent to visible radiation and has an index of refraction in a range of about 1.4 to about 1.7, and more preferably in a range of about 1.45 to about 1.65. Some examples of suitable materials for making the lens 100 include, without limitation, polymethyl methacrylate (PMMA), glass, polycarbonate, cyclic olefin copolymer and cyclic olefin polymer. As the refractive index of the material bears on the critical angle for total internal reflection, the precise arrangement of the lens surfaces can vary depending on the material selected (or, in some cases, the desired arrangement may drive the choice of material).

Figure 6:
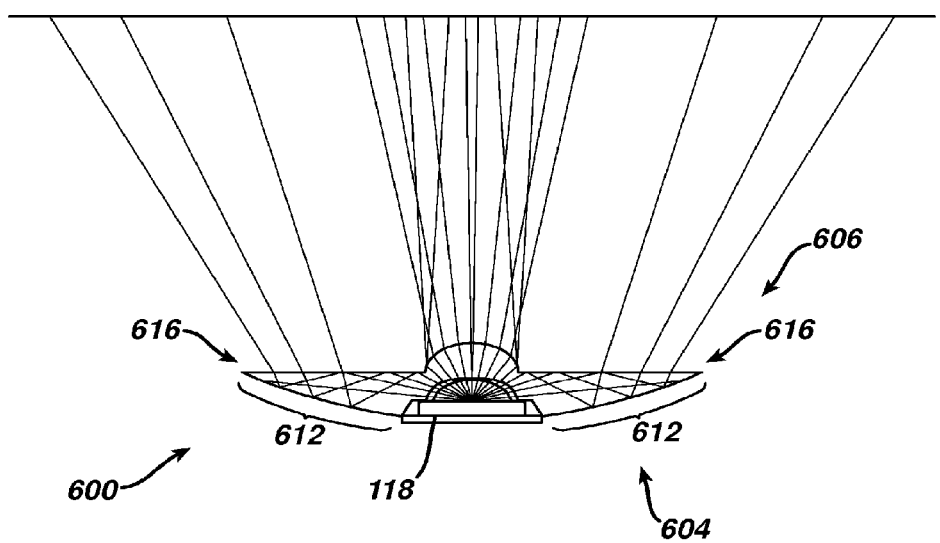
FIG. 6 is a schematic view of another embodiment of a lens configured to totally internally reflect light at a peripheral portion of its anterior surface, the schematic view depicting an exemplary cross-section of the lens.

In addition, a variety of reflective coatings can be employed to alter or facilitate the functionality of the lens 100. In the embodiment illustrated in FIGS. 1A-1C, the peripheral portion of the anterior surface 112 is metallized to reflect light with reflective layer 140. In other embodiments, reflection at the peripheral portion of the anterior surface 112 can be due to total internal reflection (e.g., by adjusting the radius of curvature of the peripheral portion of the anterior surface 112). For example, FIG. 6 illustrates an alternate embodiment of a lens 600 with an anterior surface 604 and a posterior surface 606 in which the peripheral portion of the posterior surface 616 and the peripheral portion of the anterior surface 612 are both configured for total internal reflection.

Figure 7:
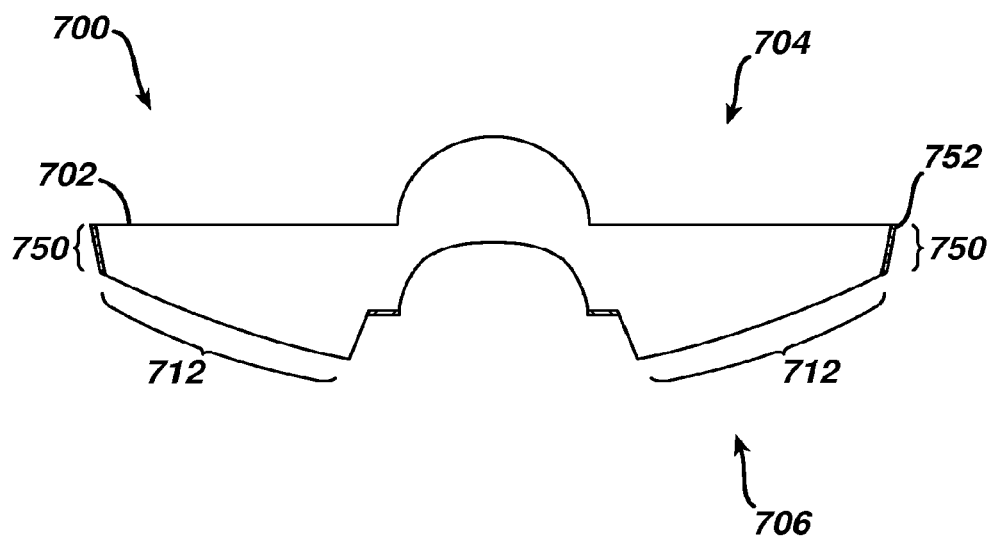
FIG. 7 is a schematic view of an exemplary embodiment of a lens having a posterior surface and an anterior surface that has a reflectively-coated faceted portion, the schematic view depicting an exemplary cross-section of the lens.

In other embodiments, part of the peripheral portion of the anterior surface can be configured for total internal reflection and part of the peripheral portion of the anterior surface can have a completely or partially reflective coating (e.g., metallization to provide specular reflection). For example, area 134 shown in FIG. 1C can have a completely or partially reflective coating. Some light passing through the optic 102 and incident on the peripheral portion of the anterior surface 112 can be reflected via total internal reflection, while other light passing through the optic 102 and incident on area 134 of the peripheral portion of the anterior surface 112 (e.g., at an angle too steep for total internal reflection) can be reflected due to the reflective coating. The anterior surface 104 can have a variety of shapes to take advantage of this arrangement. By way of further illustration, FIG. 7 shows a lens 700 having a posterior surface 706 and an anterior surface 704. The peripheral portion of the anterior surface 712 can include a faceted portion 750 at the periphery of the lens 700. Some light passing through the optic 702 and incident on the faceted portion may not be reflected by total internal reflection. As shown, the faceted portion 750 has a reflective coating 752 to reflect light which may otherwise refract and escape the optic 702. The faceted portion 750 can allow for a more compact lens size, among other things. It should be understood that while in the exemplary embodiment of FIG. 7 the faceted portion 750 is flat, it can also be curved.

Reflective coatings can also be employed on the posterior surface 106 of the lens 100. For example, in some embodiments, the peripheral portion of the posterior surface 116 can have a reflective coating, for example, a partially reflective coating (e.g., a partially reflective metallization layer). Referring to FIG. 2, such an arrangement can allow light rays 204 to come from the light source 118, pass through the optic 102 to be reflected (some rays may be reflected due to the metalized coating and others may be reflected due to total internal reflection) from the peripheral portion of the posterior surface 116 to the peripheral portion of the anterior surface 112 (e.g., light ray 204 at location 204a), but also allow the light rays returning from the peripheral portion of the anterior surface 112 to be refracted at the peripheral portion of the posterior surface 116 to exit the optic 102 (e.g., ray 204 at location 204c). The reflected light rays, in this embodiment, may be light rays that would otherwise not have been totally internally reflected after their initial passage through the optic 102 from the light source 118 (e.g., light ray 204 at location 204a), for example, because their angle of incidence on the peripheral portion of the posterior surface 116 is too large for total internal reflection. Consequently, aspects of the lens, such as the thickness of the lens body or the relative positions of the anterior and posterior surfaces, can be different than the corresponding aspects in those embodiments that are configured to achieve total internal reflection at the peripheral portions of the posterior surface 116.

In other embodiments, an area adjacent to the central portion of the posterior surface (e.g., area 132, shown on FIG. 1C) can have a completely or partially reflective coating to reflect light rays incident thereon via a single passage through the optic 102 from the light source 118. The size of the area coated with the reflective material can vary; however, in some embodiments it can be sized to reflect light rays that are approaching the peripheral portion of the posterior surface 116 at too steep an angle to be totally internally reflected for a given position (e.g., a chosen narrow beam position) of the light source 118.

Other geometrical profiles can also be employed for the surfaces of the lens 100. For example, the peripheral portion of the anterior surface 116 can have a profile defined by other conic sections, for example, hyperbola, circle, ellipse. In some applications, a flat reflective anterior surface can be disposed at an angle to the optical surface so as to reflect light received from total internal reflection at the peripheral portion of the posterior surface 116. The peripheral portion of the anterior surface 112 need not be smooth. For example, FIG. 8A shows an exemplary embodiment of a lens 800 having a posterior surface 806 and an anterior surface 804 that has a faceted peripheral portion 812. FIG. 8B shows another exemplary embodiment of a lens 850 having a posterior surface 856 and an anterior surface 854 that has a faceted peripheral portion 862. Some of the facets 813, 863 can be configured for total internal reflection, while others are configured to be at least partially reflective. The profile of the peripheral portion of the posterior surface 116 of lens 100 can also vary. The peripheral portion of the posterior surface 116 can have a convex or concave profile, for example, to obtain or adjust the desired convergence/divergence characteristics of the light rays exiting the peripheral portion. In other embodiments, the peripheral portion of the posterior surface 116 can have a corrugated surface (e.g., sawtooth or triangular surface features, or other ridges and grooves). Other profiles, e.g., such as the conic sections described above, are also possible for the peripheral portion of the posterior surface 116. In many cases the desired illumination profile can dictate such variations to the surfaces, while adhering to the principles described above.

Figure 9:
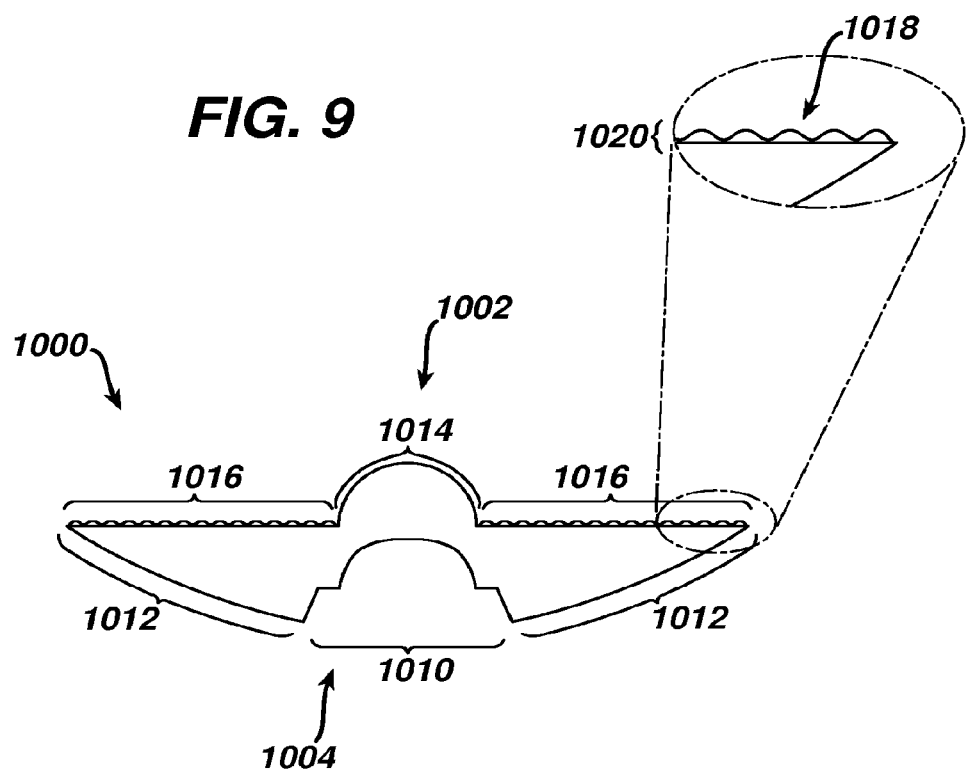
FIG. 9 is a schematic view of the lens shown in FIG. 1A with undulations formed on a peripheral portion of its posterior surface.

In some embodiments, at least a segment of the posterior surface 104 can be textured so as to cause diffusion of the light leaving the optic 102 via the textured segment. The textured segment can be characterized by surface undulations having an average peak-to-trough excursion (amplitude) 1020, e.g., in a range of about 5 microns to about 50 microns. By way of example, a lens 1000 is depicted in FIG. 9 having a posterior surface 1002 and an anterior surface 1004. Similar to the lens 100, the posterior surface 1002 includes a central portion 1014 and a peripheral portion 1016 and the anterior surface 1004 includes a central portion 1010 and a peripheral portion 1012. However, unlike the lens 100, the peripheral portion of the posterior surface 1016 includes a plurality of surface undulations 1018 (that is, the peripheral posterior portion 1016 is textured). The lens 1000 functions similarly to aforementioned lenses except that the light leaving the peripheral portion of the posterior surface 1016 undergoes some scattering due to the texturing of the surface. Such scattering can cause diffusion of the output light, thereby resulting in a more uniform illumination of a region of interest. The undulations can be created, for example, using a mechanical texturing or roughening process on the surface of the lens, chemical treatment, or other techniques.

Figure 10:
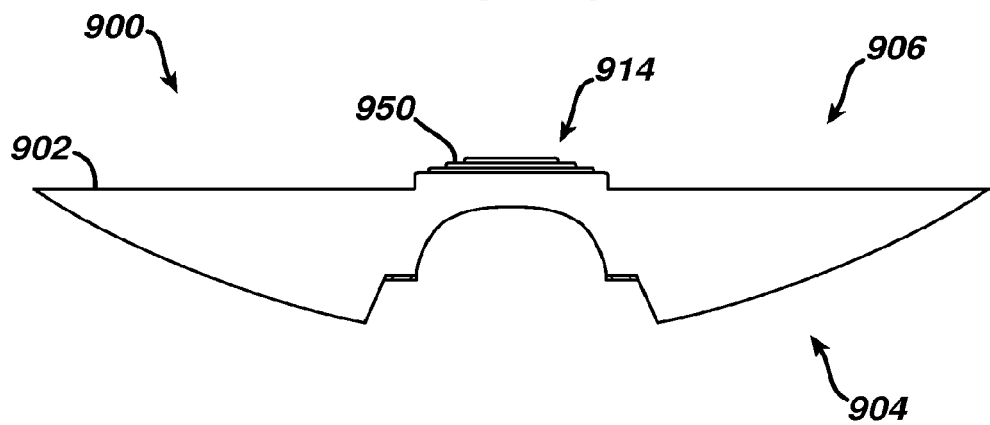
FIG. 10 is a schematic view of an exemplary embodiment of a lens having a posterior surface that includes a monofocal diffractive lens, the schematic view depicting an exemplary cross-section of the lens.
Figure 11:
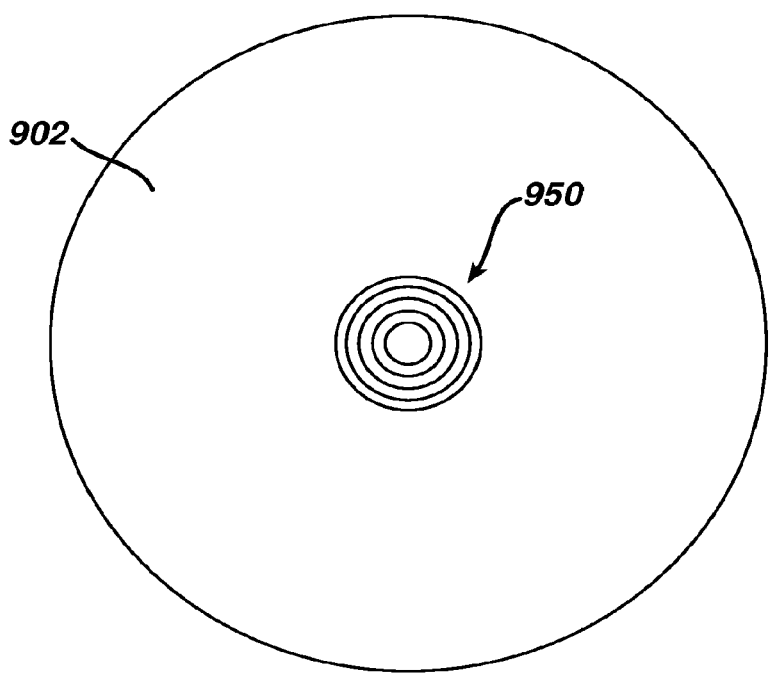
FIG. 11 is a top view of the lens shown in FIG. 10.

A variety of other lens types can be used for the central segment of the lens 100, which is defined by central portions of the anterior and posterior surfaces 110, 114. For example, the central segment can be formed as a diffractive lens, Fresnel lens, kinoform, or any positive or converging lens. FIGS. 10-11 illustrate an exemplary embodiment of a lens 900 that includes a lens body 902 with a posterior surface 906 and an anterior surface 904. As shown, the posterior surface 906 includes a central portion 914 with a monofocal diffractive lens 950.

Although the foregoing discussion has involved, for explanatory purposes, two discrete positions of the light source relative to the lens, in many cases, the source can be moved between any number of discrete positions. In other embodiments, the source can be moved in a continuous manner relative to the lens over a desired range. For example, in FIGS. 2-3, as the light source 118 is moved from a narrow beam position (FIG. 2) to a wide beam position (FIG. 3), the peripheral portion of the posterior surface 116 reflects an increasing fraction of the input light rays that are incident thereon via a single passage until it primarily causes reflection, rather than refraction, of such rays. Typically the lens can be translated along its optical axis relative to a fixed-position light source. Alternatively, the light source can be translated relative to a fixed lens, or both can be adjustable. In some embodiments, the relative movement of the lens and the light source need not be only along the optical axis (that is, there can be some degree of lateral movement), particularly where the central portions of the anterior surface are adapted to receive light off-axis.

A combination of a light source and a lens according to the invention can form a variable-focus illumination module 1100 or illumination system that can be utilized in a variety of applications, including flashlights, spotlights, adjustable or customizable lighting systems, and so on, or in any of the applications previously mentioned. For example, as shown schematically in FIG. 12, the illumination module 1100 can provide a combined lens 1102 and a light source in the form of one or more light-emitting diodes (LED) 1104 for providing a desired pattern of illumination. The lens 1102 and LED 1104 can be disposed in a housing 1114, which in some cases may represent a head piece in a flashlight. The LED 1104 can be mounted on a mounting plate 1107 and connected to an electrical power source 1109 such as a battery, which can be disposed in a housing 1106, which in some cases may act as a handle in a flashlight. In this embodiment the illumination module 1100 includes a translation mechanism 1110 that includes screw elements 1108. In other embodiments, the translation mechanism 1110 can involve a sliding assembly, for example, the module 1100 can include two or more cylindrical housings or tubes (e.g., one tube, such as housing 1114, coupled to the lens 1102 and another, such as housing 1106, coupled to the LED 1104) with the interior tube being axially slidable with respect to the outer tube. One or more of the tubes can include a physical stop (e.g., a surface feature such as a pin or ridge) to define the length of travel. In other embodiments, the translation mechanism 1110 can include nested tubes with a pin and groove system to define the range of movement. For example, a pin formed on an interior tube can mate to a groove formed in an outer tube and, as a result of axial movement, define the path of travel. The groove can be linear or can be curved so that the tubes rotate as an axial force is applied to one of the tubes, or so that they move linearly as a rotational force is applied to one of the tubes (e.g., with a motor or directly by a user). In yet other embodiments, the translation mechanism 1110 can include a post coupled to the lens 1102. The post can be accessible to a user (e.g., protruding out of the housing 1114) to allow for application of a force to the post to slide the lens 1102 relative to the LED 1104 within the housing 1114.

Figure 12:
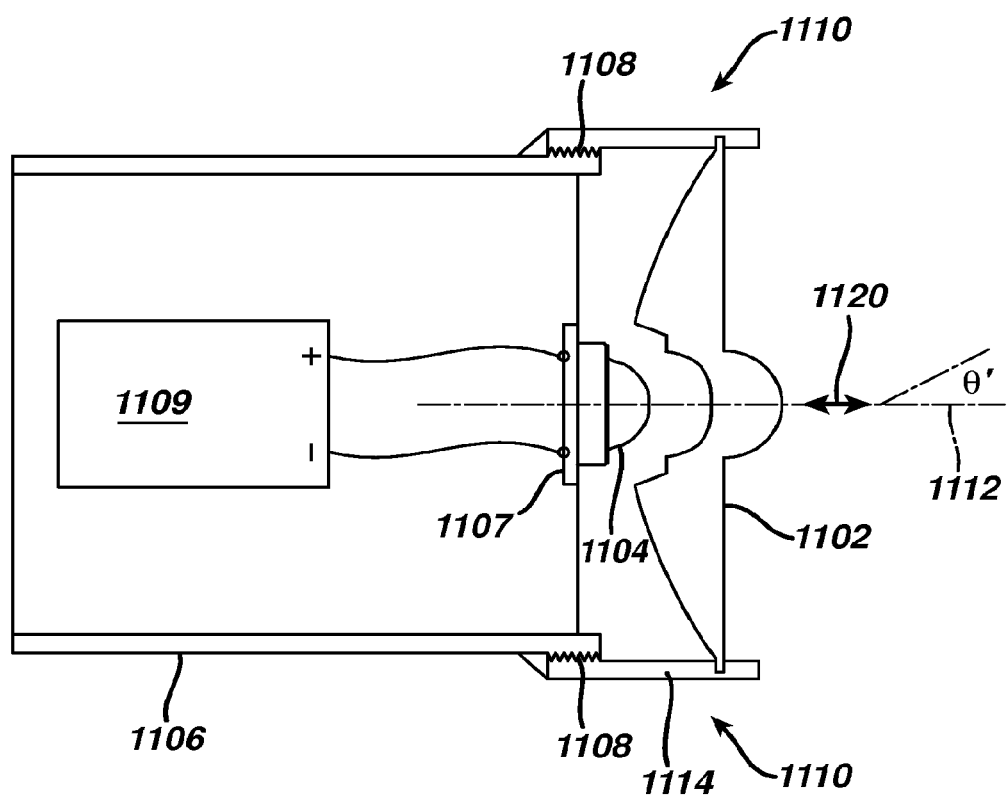
FIG. 12 is a schematic view of one exemplary embodiment of a variable-focus optical system.
Figure 13A:
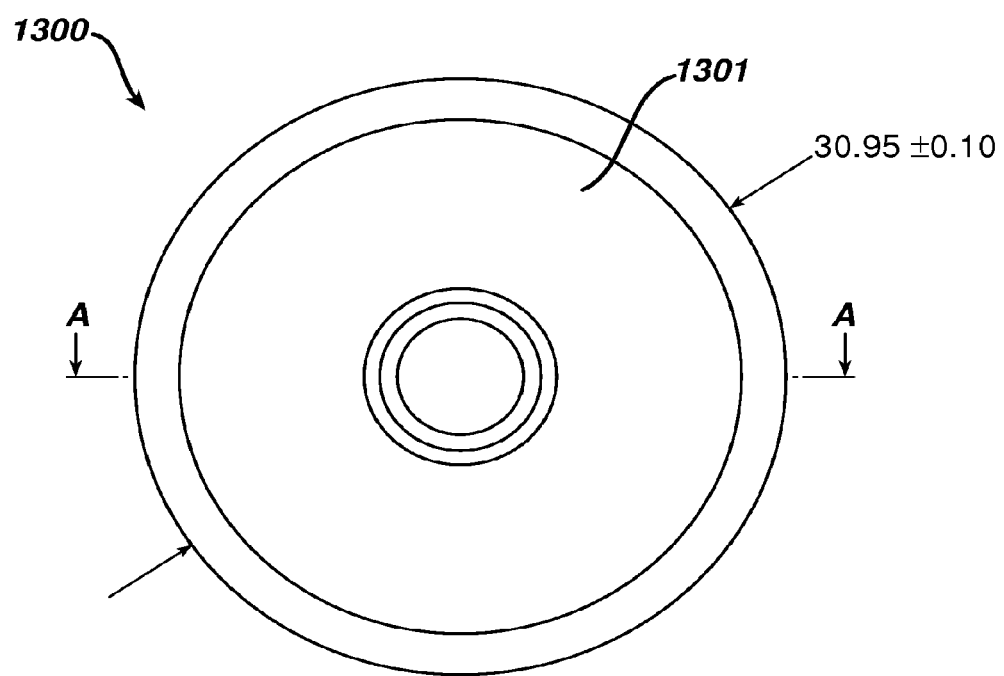
FIG. 13A is a view of an anterior surface of a prototype lens that was made to illustrate the principles described herein.
Figure 13B:
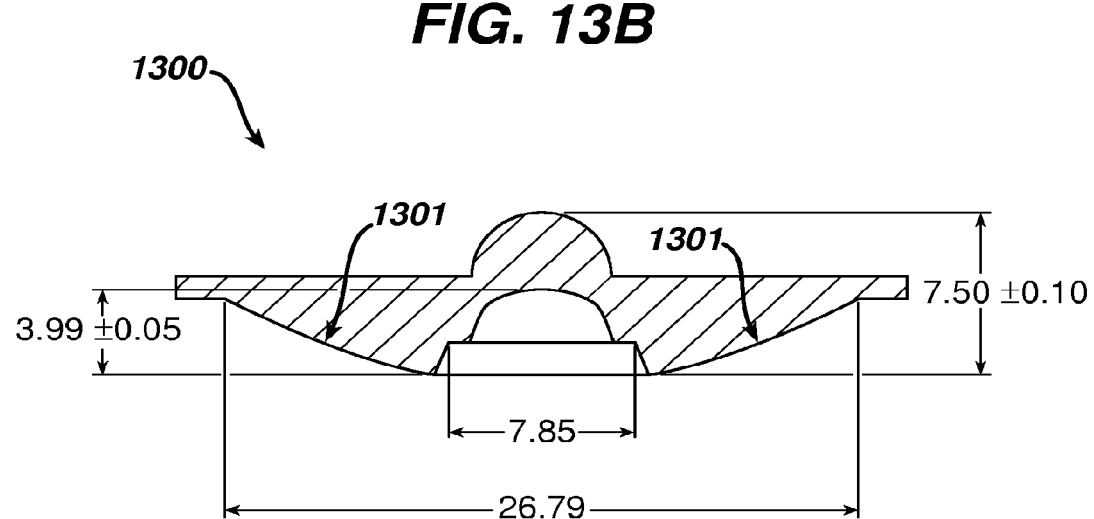
FIG. 13B is a sectional view of the prototype lens shown in FIG. 13A taken along axis A-A shown in FIG. 13A.
Figure 13C:
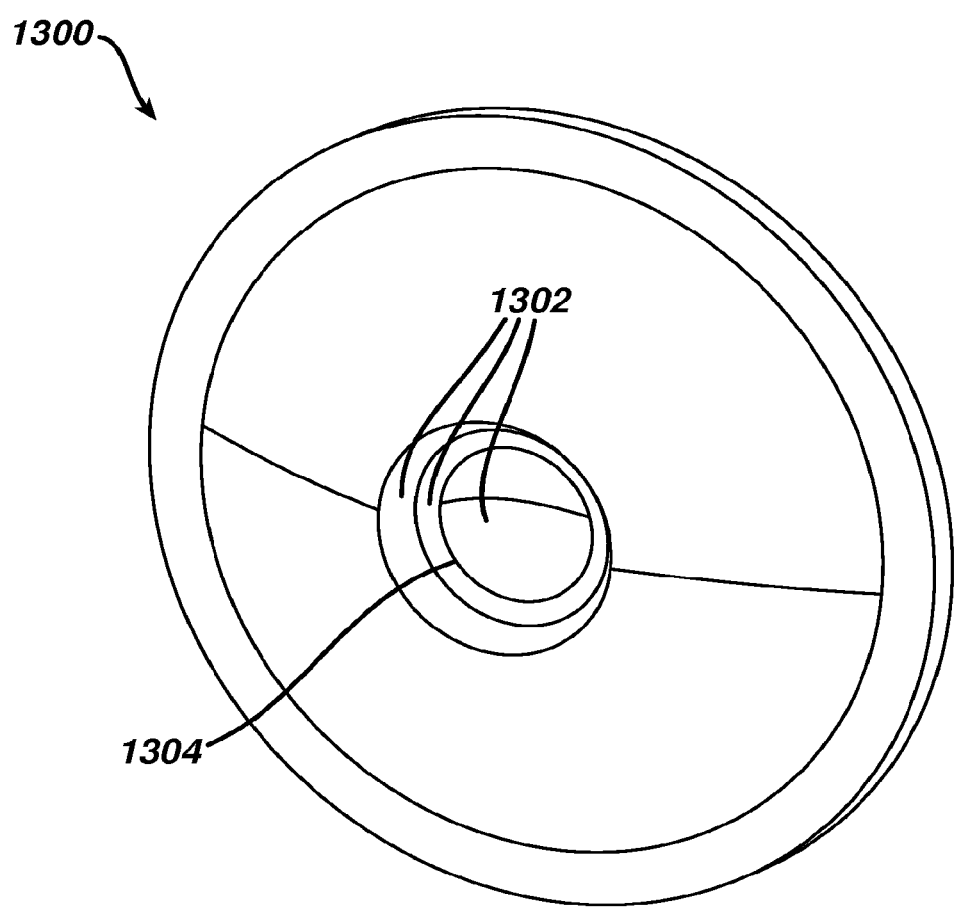
FIG. 13C is a perspective view of the anterior surface of the prototype lens shown in FIG. 13A.
Figure 13D:
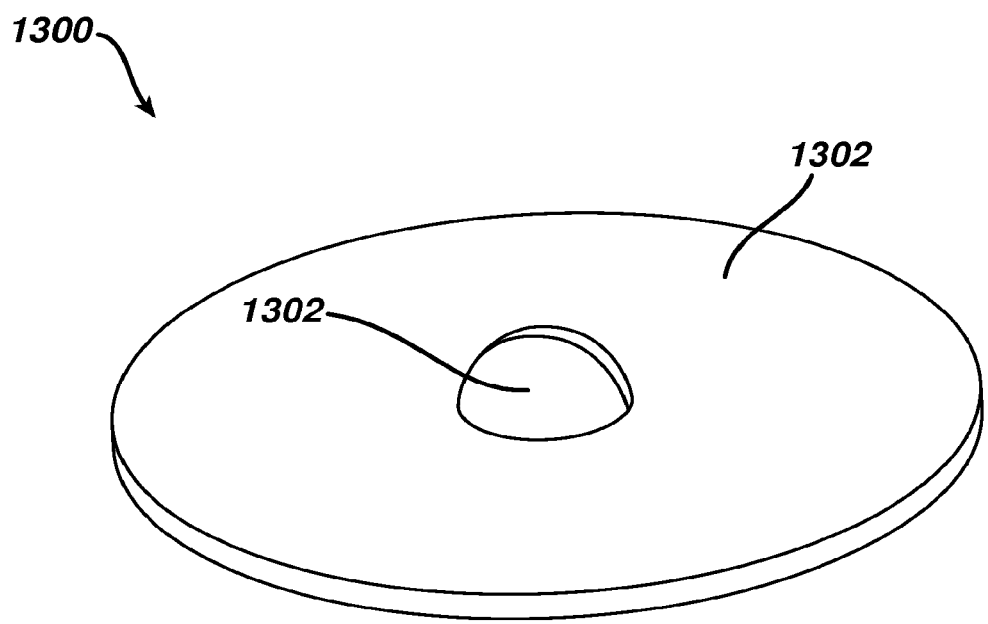
FIG. 13D is a perspective view of a posterior surface of the prototype lens shown in FIG. 13A.

In use, the translation mechanism 1110 shown in FIG. 12 can be actuated (e.g., twisted or turned) while grasping the housing 1102 to cause the screw elements 1108 to translate the lens 1102 along the optical axis 1112, as indicated by the arrows 1120. As shown, the LED 1104 or other light source can remain fixed (e.g., relative to the housing 1102) and the lens 1102 can be free to translate in response to the translation mechanism 1110. In other embodiments, the lens 1102 can remain fixed and the LED 1104 can be free to translate in response to the translation mechanism. The relative movement between the lens 1102 and/or LED 1104 changes the separation distance between the LED 1104 and the lens 1102, effectively changing the size of a light spot projected onto a target surface, and/or altering the illumination pattern, the maximum angular extent of the output light, the intensity of the light, and/or spatial variations of the light ("bright spots", etc.) and so on. The travel or change in separation distance, of the lens 1102 and/or LED 1104 between a narrow beam position and a wide beam position can vary with the size and configuration of the lens 1102, the light source 1104, and the desired illumination characteristics.

In this embodiment, the separation distance is continuously adjustable from a first position resulting in a relatively narrow beam to a second position resulting in a relatively wide beam, and these positions can have characteristics like those described above in connection with FIGS. 1-2. For example, the "narrow beam" position can be characterized by light exiting the optic primarily via refraction from a central portion of the output or posterior surface following a single passage through the optic (in some cases this may be converging light). By way of example, for this exemplary narrow beam position the output light can exit the optic 1102 with a maximum divergence angle (shown as $\theta'$ (theta-prime) in FIG. 12) relative to the optical axis 1112 of less than about 5 degrees. The "wide beam" position can be characterized by light exiting the optic from the central portion of the output or posterior surface primarily via refraction, and from a peripheral portion of output or posterior surface primarily via refraction following successive reflections (e.g., internal reflection at the peripheral portion of the anterior surface and internal reflection at the peripheral portion of the posterior surface). By way of example, for this exemplary wide beam position the output light can exit the optic with a maximum divergence angle (shown as θ' (theta-prime) in FIG. 12) relative to the optical axis 1112 of greater than about 10 degrees.

In other embodiments, the illumination module 1100 and in particular the translation mechanism 1110 can be adapted to change the relative positions of the lens 1101 and the light source 1104 between a finite number of discrete positions (e.g., in an selectable or indexed manner).

It should be noted that in an alternate embodiment of a lens, illumination device or method, the lens and the light source can be fixed relative to one another for fixed-focus applications. This is true for any of the lenses, devices and methods described above.

The appended claims are incorporated by reference herein and are considered to represent part of the detailed description of this application. Moreover, it should be understood that the features illustrated or described in connection with any exemplary embodiment may be combined with the features of any other embodiments. Such modifications and variations are intended to be included within the scope of the present application.

By way of further illustration, the following Example is provided. It should be understood that the Example and all accompanying data is provided for illustrative purposes and is not intended to necessarily show optimal results that can be achieved or that need to be achieved by employing a lens, device or method in accordance with the teachings of the invention.

EXAMPLE

A prototype lens 1300 was made for illustrative purposes. FIGS. 13A-13D shows the dimensions of this prototype lens, which was fabricated by directly machining and polishing a polymethyl methacrylate (PMMA) blank. The lens 1300 was cut from an optical grade block of PMMA into the rough shape. Successive passes with higher resolution cutting paths then created a finer surface profile for each surface. The final surface finish was created via a step down from course to fine grade diamond lapping film. Peripheral portions of the anterior surface, labeled as 1301, were metalized via a vacuum aluminum metallization process, which can provide a reflectance of 90% or greater for light of wavelengths of between 400 nm-700 nm, and the optical surfaces were mechanically polished. Areas labeled as 1302 were not metalized. A light emitting diode (LED) manufactured by Cree Corporation of Durham, N.C., USA, under trade designation XR-E 7090, was fitted into the central recess of the lens such that top of the LED package touched the inner surface of the lens, which is labeled as 1304. Exemplary dimensions are provided in FIGS. 13A-13D. These dimensions are in millimeters, although the design can be scaled to virtually any size.

Figure 14:
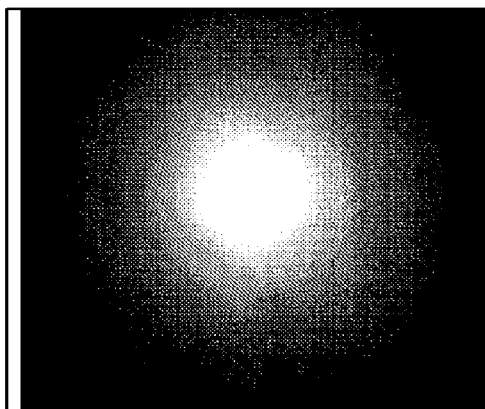
FIG. 14 is an image of a light spot on a target surface made using the prototype lens shown in FIGS. 13A-13D and includes exemplary illumination characteristics for the light spot.
Figure 15:
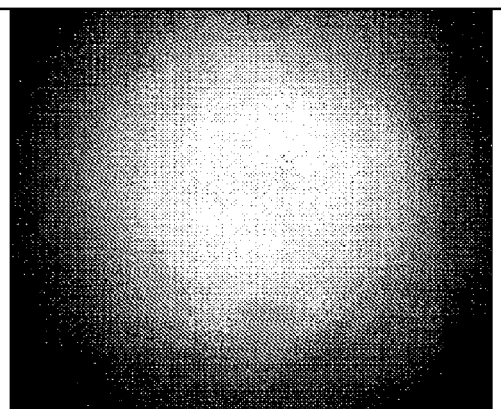
FIG. 15 is an image of another light spot on a target surface using the prototype lens shown in FIGS. 13A-13D and includes exemplary illumination characteristics for the light spot; and, FIG. 16 is a graph showing exemplary beam profile measurements taken for the prototype lens shown in FIGS. 13A-13D in the positions illustrated in FIGS. 14-15.
Figure 16:
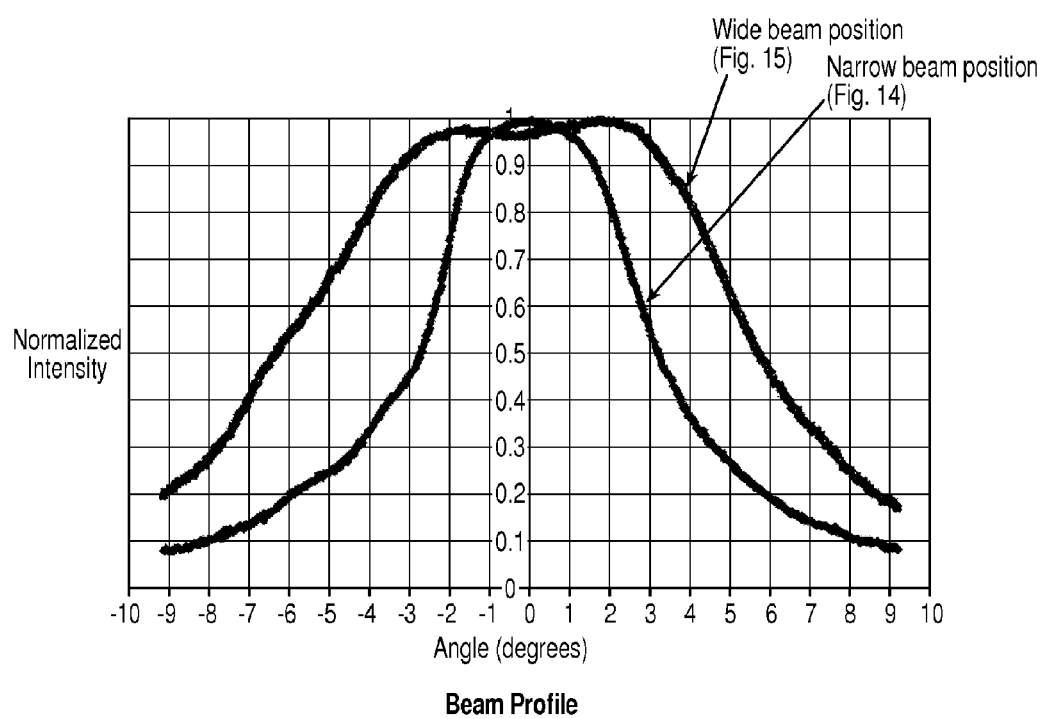

FIGS. 14 and 15 illustrate illumination patterns achieved on a target surface with the lens of FIGS. 13A-13D with the lens and LED in exemplary "narrow beam" and "wide beam" positions relative to one another. Exemplary metrics characterizing the illumination are also provided. FIG. 16 shows a beam profile corresponding to the narrow beam and wide beam illumination patterns shown in FIGS. 14 and 15. The travel (change in separation distance for the lens of FIGS. 13A-13D and the light source used therewith) between the narrow beam position of FIG. 14 and the wide beam position of FIG. 15 was approximately 3 mm. As one skilled in the art will understand, all of the metrics provided in this Example and accompanying FIGURES are exemplary in nature, and the lens shown in FIGS. 13A-13D can also be formed by other means, such as injection molding.

We claim:

1. An optical system, comprising:
a light source,
a lens optically coupled to the light source for receiving light therefrom,
said lens and the light source being movable relative to one another along an optical axis of the lens between a narrow beam position and a wide beam position,
said lens having a lens body disposed about an optical axis and characterized by an anterior surface and a posterior surface, at least a portion of the anterior surface being adapted for receiving light from a light source, said posterior surface having a central portion and a peripheral portion,
wherein for said narrow beam position the light received from the light source exits the lens primarily via refraction from said central portion of the posterior surface and for said wide beam position the light received from the light source exits the lens via refraction from said central portion and via refraction from said peripheral portion of the posterior surface following successive reflections from said peripheral portion of the posterior surface and a peripheral portion of the anterior surface.

2. The optical system of claim 1, wherein said peripheral portion of the anterior surface reflects light received from said posterior peripheral portion back thereto.

3. The optical system of claim 1, wherein said peripheral portion of the anterior surface reflects light received from said posterior peripheral portion back thereto such that said posterior peripheral portion primarily refracts said reflected light as it exits the lens body.

4. The optical system of claim 1, wherein at least a portion of said peripheral portion of the anterior surface is coated with a reflective material.

5. The optical system of claim 1, wherein said reflection by said posterior peripheral portion comprises total internal reflection.

6. The optical system of claim 1, wherein said anterior surface comprises a central portion adapted to receive light from the light source, said central portion of the anterior surface and said central portion of the posterior surface defining a portion of the lens body that provides an optical power.

7. The optical system of claim 6, wherein said optical power is a converging optical power.

8. The optical system of claim 1, wherein said peripheral portion of said posterior surface has a flat profile.

9. The optical system of claim 8, wherein said central portion of said posterior surface has a convex profile.

10. The optical system of claim 1, wherein said peripheral portion of said anterior surface has any of a substantially cup-shaped, parabolic, and elliptical profile.

11. The optical system of claim 1, wherein for at least one position of the light source along the optical axis said posterior peripheral portion reflects at least about 90% of light incident thereon via a single passage through the lens body from the light source and said posterior central portion refracts at least about 90% of light incident thereon via a single passage through the lens body from the light source.

12. The optical system of claim 1, wherein for at least one position of the light source along the optical axis said posterior peripheral portion reflects at least about 95% of light incident thereon via a single passage through the lens body from the light source and said posterior central portion refracts at least about 95% of light incident thereon via a single passage through the lens body from the light source.

13. The optical system of claim 1, wherein said light source comprises a light-emitting diode.

14. An optical system, comprising:
a light source,
a lens optically coupled to the light source for receiving light therefrom, said lens and the light source being movable relative to one another between a narrow beam position and a wide beam position,
said lens having an anterior surface and a posterior surface disposed about an optical axis, each of said surfaces having a central portion and a peripheral portion, said central portion of the anterior surface being adapted to receive light from a source disposed along said optical axis and said central portion of the posterior surface being adapted to refract at least some of the source light entering the optic,
wherein, for a plurality of positions of the source along the optical axis, said peripheral surface portions are adapted to direct at least some of said received source light out of the lens via successive reflections at said posterior and anterior peripheral portions, followed by refraction at said posterior peripheral portion.

15. The optical system of claim 14, wherein said central portions of the anterior and posterior surfaces define a portion of the optic providing an optical power.

16. The optical system of claim 15, wherein said optical power is in a range of about 120 diopters to about 160 diopters.

17. The optical system of claim 15, wherein said optical power is a converging optical power.

18. The optical system of claim 14, wherein the plurality of positions of the source long the optical axis include all positions in which light exiting the source at an angle of at least about 25 degrees to the optical axis is incident on the central portion of the anterior surface.

19. The optical system of claim 14, wherein a portion of said peripheral portion of the posterior surface comprises a reflective coating.

20. A flashlight, comprising
a light source,
a lens body having an anterior surface and a posterior surface configured such that a central portion of the anterior surface is adapted to receive light from the light source, said lens and the light source being movable relative to one another between a narrow beam position and a wide beam position,
wherein for at least one position of the light source relative to the lens, a central portion of the posterior surface is configured to primarily cause refraction of light from the light source incident thereon via passage through the lens body and a peripheral portion of said posterior surface is configured to primarily cause reflection of light from the light source incident thereon via a single passage through the lens body.

21. The flashlight of claim 20, wherein the peripheral portion of the posterior surface is configured to primarily cause total internal reflection of said light from the light source toward a peripheral portion of said anterior surface.

22. The flashlight of claim 20, wherein a peripheral portion of the anterior surface is configured to primarily cause reflection of light that is incident thereon as a result of being reflected from said peripheral portion of the posterior surface.

23. The flashlight of claim 22, wherein said peripheral portion of said anterior surface has any of a substantially cup-shaped, parabolic, and elliptical profile.

24. The flashlight of claim 22, wherein said peripheral portion of the anterior surface comprises a metallic coating for causing reflection of light incident thereon.

25. The flashlight of claim 20, wherein the central portions of each of said anterior and posterior surfaces have a profile that is any of substantially cup-shaped, spherical, parabolic, and elliptical.

26. The flashlight of claim 20, wherein said peripheral portion of said posterior surface has a flat profile.

27. The flashlight of claim 20, wherein said central portion of said posterior surface has a convex profile.

28. The flashlight of claim 20, wherein said central portion of the anterior surface has a concave profile forming a cavity in said lens body in which the light source can be disposed.

29. The flashlight of claim 20, wherein said central portions of the said anterior and posterior surfaces together provide an optical power of about 120 to about 160 diopters.

30. The flashlight of claim 20, wherein for at least one position of the light source anterior to the central portion of the anterior surface, the central portion of the posterior surface is configured to cause refraction of at least about 90% of light from the light source incident thereon via passage through the lens body and a peripheral portion of said posterior surface is configured to cause reflection of at least about 90% of light from the light source incident thereon via a single passage through the lens body.

31. The flashlight of claim 20, wherein for at least one position of the light source anterior to the central portion of the anterior surface, the central portion of the posterior surface is configured to cause refraction of at least about 95% of light from the light source incident thereon via passage through the lens body and a peripheral portion of said posterior surface is configured to cause reflection of at least about 95% of light from the light source incident thereon via a single passage through the lens body.

32. The flashlight of claim 20, wherein said light source comprises a light-emitting diode.

33. The optical system of claim 1, wherein in said narrow beam position the light leaving the lens through said central portion of the posterior surface forms a converging set of light rays.

34. The optical system of claim 1, wherein in said wide beam position the light leaving the lens through the central portion of the posterior surface forms a diverging set of light rays.

35. The optical system of claim 1, wherein at least a segment of the posterior surface of the lens is textured so as to cause diffusion of the light leaving the lens through said segment.

36. The optical system of claim 35, wherein said textured segment is characterized by surface undulations having an average peak-to-trough excursion in a range of about 5 microns to about 50 microns.

37. The optical system of claim 1, further comprising a translation mechanism for moving the lens and the source relative to one another.

38. The optical system of claim 37, wherein said translation mechanism is adapted to move the light source relative to the lens between a plurality of discrete positions.

39. The optical system of claim 37, wherein said translation mechanism is adapted to the light source in a continuous manner relative to the lens.

40. The flashlight of claim 20, wherein in said narrow beam position the light leaving the lens through said central portion of the posterior surface forms a converging set of light rays.

41. The flashlight of claim 20, wherein in said wide beam position the light leaving the lens through the central portion of the posterior surface forms a diverging set of light rays.

* * * * *